(12) United States Patent
Lee

(10) Patent No.: US 12,427,541 B2
(45) Date of Patent: Sep. 30, 2025

(54) ELECTRODE COATING SYSTEM

(71) Applicants: HYUNDAI MOTOR COMPANY, Seoul (KR); KIA CORPORATION, Seoul (KR)

(72) Inventor: Jun Won Lee, Cheonan-si (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 137 days.

(21) Appl. No.: 17/978,515

(22) Filed: Nov. 1, 2022

(65) Prior Publication Data

US 2023/0173532 A1 Jun. 8, 2023

(30) Foreign Application Priority Data

Dec. 2, 2021 (KR) .................. 10-2021-0171085

(51) Int. Cl.
| | | |
|---|---|---|
| B05C 11/10 | (2006.01) | |
| B01D 35/143 | (2006.01) | |
| B01D 37/04 | (2006.01) | |
| B05C 5/02 | (2006.01) | |

(52) U.S. Cl.
CPC ........ B05C 11/1013 (2013.01); B01D 35/143 (2013.01); B01D 37/043 (2013.01); B05C 5/0258 (2013.01)

(58) Field of Classification Search
None
See application file for complete search history.

(56) References Cited

U.S. PATENT DOCUMENTS

| | | | | |
|---|---|---|---|---|
| 5,059,331 A | * | 10/1991 | Goyal | B01D 29/66 210/785 |
| 5,185,084 A | * | 2/1993 | Lapidus | G01N 15/0272 210/90 |
| 5,655,896 A | * | 8/1997 | Konieczynski | B05B 5/1675 239/708 |
| 6,383,571 B1 | * | 5/2002 | Muhlfriedel | B05C 9/02 427/420 |
| 6,641,670 B2 | * | 11/2003 | Tsujii | C03C 17/001 118/410 |
| 6,726,773 B1 | * | 4/2004 | Yanagita | B05B 9/047 222/61 |
| 6,783,803 B2 | * | 8/2004 | Tsujii | C03C 17/001 427/256 |
| 6,884,281 B2 | * | 4/2005 | Takahashi | B03D 1/04 95/266 |

(Continued)

FOREIGN PATENT DOCUMENTS

| | | |
|---|---|---|
| CN | 111299093 A | 6/2020 |
| JP | 2002-174167 A | 6/2002 |

(Continued)

*Primary Examiner* — Jethro M. Pence
(74) *Attorney, Agent, or Firm* — MCDONNELL BOEHNEN HULBERT & BERGHOFF LLP

(57) ABSTRACT

An electrode coating system includes a slurry storage tank in which a slurry is stored, a coating slot die configured to receive the slurry, and a line through which the slurry flows from the slurry storage tank to the coating slot die, in which the line includes a first line and a second line, and the slurry is configured to flow from the slurry storage tank to the coating slot die selectively through the first line or the second line.

8 Claims, 8 Drawing Sheets

(56) References Cited

U.S. PATENT DOCUMENTS

| | | | |
|---|---|---|---|
| 7,967,168 B2* | 6/2011 | Geier | B29B 7/728 |
| | | | 222/1 |
| 9,238,244 B2 | 1/2016 | Hayama | |
| 12,036,574 B2* | 7/2024 | Ikushima | B05C 5/00 |
| 12,074,306 B2* | 8/2024 | Kang | B05C 11/1007 |
| 2003/0154916 A1* | 8/2003 | Takekuma | B05C 5/0254 |
| | | | 417/572 |
| 2006/0254389 A1* | 11/2006 | Ickinger | B22F 1/12 |
| | | | 266/216 |
| 2012/0291704 A1* | 11/2012 | Nozaki | B01D 19/0057 |
| | | | 118/712 |
| 2014/0186523 A1* | 7/2014 | Lee | H01M 4/881 |
| | | | 118/300 |
| 2015/0028055 A1* | 1/2015 | Hayama | B05C 5/0225 |
| | | | 222/1 |
| 2015/0182986 A1* | 7/2015 | Kusakari | B05C 11/1002 |
| | | | 118/699 |
| 2022/0199432 A1* | 6/2022 | Lee | H01L 21/67057 |

FOREIGN PATENT DOCUMENTS

| | | | |
|---|---|---|---|
| JP | 2012-211568 A | 11/2012 | |
| JP | 6759010 B2 | 9/2020 | |
| JP | 2020-157194 A | 10/2020 | |
| KR | 10-0583432 B1 | 5/2006 | |
| KR | 10-1294242 B1 | 8/2013 | |
| KR | 2017-0105752 A | 9/2017 | |

* cited by examiner

ELECTRODE COATING SYSTEM

CROSS REFERENCE TO RELATED APPLICATIONS

This application claims under 35 U.S.C. § 119(a) the benefit of priority to Korean Patent Application No. 10-2021-0171085, filed on Dec. 2, 2021, the entire contents of which are incorporated herein by reference.

BACKGROUND

(a) Technical Field

The present disclosure relates to an electrode coating system of a battery.

(b) Background Art

A lithium-ion battery cell includes a positive electrode, a negative electrode, a separator, and an electrolytic solution. The positive electrode and the negative electrode are manufactured through mixing, coating, and rolling processes. Each raw material in a solid state for the positive electrode and the negative electrode is dispersed in a specific solvent and then manufactured and stored as a slurry (mixing process), and the stored slurry is coated and dried on a metal thin film so that the anode and the cathode are manufactured (coating process).

The stored slurry is coated through a coating slot die. At this time, the stored slurry moves up to the coating slot die through a transport pipe and passes through a filter for removing impurities during the transport. When a problem occurs in the filter, such as a clogged filter, this may affect battery cells. Accordingly, the filter is regularly checked to ensure that the filter is properly functioning by an operator, for example. In addition, when the abnormality is found in the filter, a coating operation line is stopped and the filter is replaced.

The above information disclosed in this Background section is only for enhancement of understanding of the background of the disclosure and accordingly it may include information that does not form the prior art that is already known in this country to a person of ordinary skill in the art.

SUMMARY

The present disclosure has been made in efforts to solve the above problem, and an object of the present disclosure is to provide an electrode coating system capable of allowing a coating operation line to be continuously operated without interruption when a filter is replaced.

The object of the present disclosure is not limited to the above-described object, and other objects not mentioned will be clearly understood by those skilled in the art to which the present disclosure (hereinafter, referred to as 'those skilled in the art') from the following description.

The characteristics of the present disclosure for achieving the object of the present disclosure and performing the characteristic functions of the present disclosure to be described later are as follows.

According to some embodiments of the present disclosure, an electrode coating system includes a slurry storage tank in which a slurry is stored, a coating slot die configured to receive the slurry, and a line through which the slurry flows from the slurry storage tank to the coating slot die, in which the line includes a first line and a second line, and the slurry is configured to selectively flow from the slurry storage tank to the coating slot die through the first line or the second line.

According to some embodiments of the present disclosure, a method of controlling an electrode coating system includes directing a slurry within a slurry storage tank to a coating slot die through a first line—the first line includes a first filter configured to remove impurities from the slurry, and directing the slurry within the slurry storage tank to the coating slot die through a second line when the first filter is failed, in which a flow to the second line is switched by an upstream selection unit disposed at a downstream of the slurry storage tank with respect to a flow direction of the slurry and configured to allow or block a flow to the first line, and allow or block the flow to the second line.

According to some embodiments of the present disclosure, a method of controlling an electrode coating system includes directing a slurry within a slurry storage tank to a coating slot die through a first line and a second line, wherein the first line and the second line include a first supply pump and a second supply pump configured to provide a flow force to the slurry, respectively, and the first line and the second line include a first filter and a second filter configured to remove impurities from the slurry, respectively; detecting a failure of the first filter; stopping an operation of the first supply pump; and increasing an operation output of the second supply pump so that operation outputs of the first supply pump and the second supply pump are substantially the same as each other before the first filter is failed.

The present disclosure provides the electrode coating system capable of allowing the coating operation line to be continuously operated without interruption when the filter is replaced.

The effect of the present disclosure is not limited to the above-described effect, and other effects not mentioned will be clearly recognized by those skilled in the art from the following description.

It is understood that the term "automotive" or "vehicular" or other similar term as used herein is inclusive of motor automotives in general such as passenger automobiles including sports utility automotives (operation SUV), buses, trucks, various commercial automotives, watercraft including a variety of boats and ships, aircraft, and the like, and includes hybrid automotives, electric automotives, plug-in hybrid electric automotives, hydrogen-powered automotives and other alternative fuel automotives (e.g., fuels derived from resources other than petroleum). As referred to herein, a hybrid automotive is an automotive that has two or more sources of power, for example both gasoline-powered and electric-powered automotives.

The above and other features of the disclosure are discussed infra.

BRIEF DESCRIPTION OF THE FIGURES

The above and other features of the present disclosure will now be described in detail with reference to certain exemplary examples thereof illustrated in the accompanying drawings which are given herein below by way of illustration only, and thus are not limitative of the present disclosure, and wherein.

Figure 1:
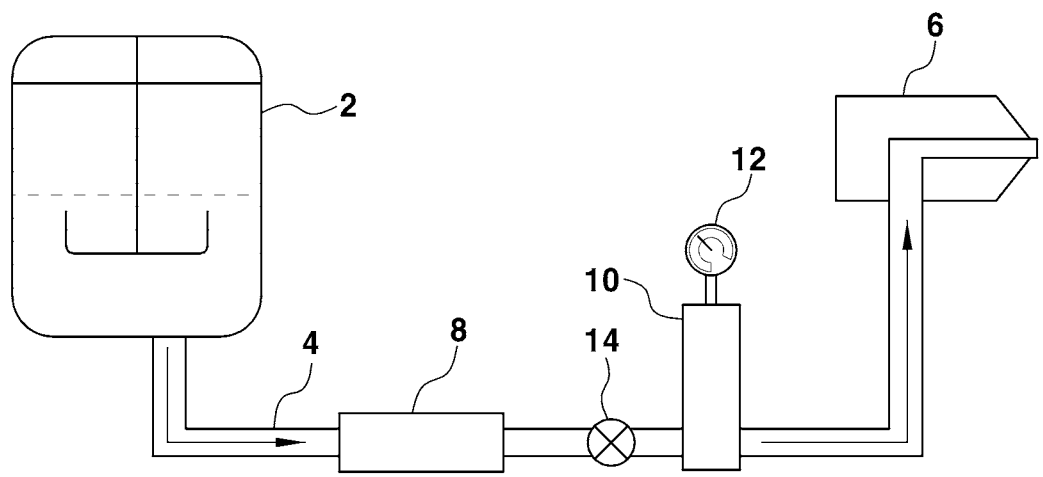
FIG. 1 shows one example of an electrode coating system.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in section by the particular intended application and use environment.

In the figures, reference numbers refer to the same or equivalent sections of the present disclosure throughout the several figures of the drawing.

DETAILED DESCRIPTION

Specific structural or functional descriptions presented in the embodiments of the disclosure are only exemplified for the purpose of describing the embodiments according to the concept of the present disclosure, and the embodiments according to the concept of the present disclosure may be carried out in various forms. In addition, the present disclosure should not be construed as being limited to the embodiments described herein, and should be understood to include all modifications, equivalents, and substitutes included in the spirit and technical scope of the present disclosure.

Meanwhile, in the present disclosure, terms such as first and/or second may be used to describe various components, but the components are not limited by the terms. The above terms are used only for the purpose of distinguishing one component from other components, for example, a first component may be named as a second component, and similarly, the second component may also be named as the first component without departing from the scope according to the concept of the present disclosure.

When a component is said to be "connected" or "coupled" to another component, it should be understood that a component may be directly connected or coupled to another component, but other components may exist therebetween. On the other hand, when a component is said to be "directly connected" or "in direct contact with" another component, it should be understood that no other components exist therebetween. Other expressions for describing the relationship between components, that is, expressions such as "between" and "directly between" or "adjacent to" and "directly adjacent to", should be interpreted in a similar manner.

The same reference numerals refer to the same components throughout the specification. Meanwhile, the terms used herein is for the purpose of describing the embodiments, and is not intended to limit the present disclosure. In this specification, the singular form also includes the plural form unless otherwise specified in the phrase. "Comprises" and/or "comprising" used herein means that the presence or addition of one or more other components, operations, operations, and/or elements other than the stated component, operation, operation, and/or element is not precluded.

Hereinafter, the present disclosure will be described in detail with reference to the accompanying drawings.

As shown in FIG. 1, for coating a slurry, the slurry stored in a slurry storage tank 2 through a mixing process is moved along a flow path 4 and coated in a coating slot die 6. The flow path 4 is provided with a supply pump 8 and a filter 10.

The supply pump 8 provides a moving force for flowing the slurry in the slurry storage tank 2 toward the coating slot die 6 through the flow path 4.

The filter 10 is disposed downstream of the supply pump 8 with respect to a flow direction of the slurry in the flow path 4. The filter 10 filters impurities present in the slurry passing through the flow path 4.

When the filter 10 loses its function, for example, such as when the filter 10 is damaged and may not filter impurities or the filter is clogged by a large amount of impurities, as described above, an operator should recognize a failure of the filter 10 and take actions, such as replacement and cleaning of the filter 10, in a timely manner.

The clogging of the filter 10 may be determined by, for example, a pressure gauge 12 provided in the filter 10. In other words, when a measured value by the pressure gauge 12 is out of a normal range, the abnormality of the filter 10 may be predicted.

However, even when the abnormality occurs in the measured value of the pressure gauge 12, there is no separate alarm function, and the operator has to frequently check the measured value of the pressure gauge 12 with the naked eye. When the measured value by the pressure gauge 12 is not normal, a valve 14 is closed, and the filter 10 is cleaned or replaced. Even when the abnormality of the filter 10 is checked, a considerable amount of time is required for the maintenance of the filter 10, and a coating operation line through transport during filter maintenance is stopped. In FIG. 1, the valve 14 located upstream of the filter 10 in the flow path 4 is a valve configured to open and close in order to prevent the flow of the slurry when the filter 10 is replaced.

In summary, when the abnormality of the filter is not detected in a timely manner, an abnormality in an electrode quality may occur, and performance of a battery cell may be degraded. When a pressure of the filter is less than a normal pressure, such as due to tearing of the filter, impurities may be introduced into the cell, resulting in degrading the capacity, output, lifespan, and the like of the cell. Conversely, when the pressure of the filter exceeds the normal pressure, such as preventing the smooth movement of the slurry due to a large amount of impurities accumulating in the filter, a constant flow of slurry may not be supplied, resulting in uneven coating loading, which may degrade the performance due to the deviation of the capacity, output, and lifespan of each cell.

In addition, in a system shown in FIG. 1, when the filter is abnormal, a transport-coating operation line is stopped while the filter is being maintained, thereby making it difficult, if not impossible to achieve a target production volume.

In addition, after the filter is replaced, an additional condition adjustment may be required in a coating process, resulting in a disposal cost. In other words, a loss due to disposal of the slurry and a current collector caused by the additional condition adjustment may occur.

Accordingly, in order to solve this problem, the present disclosure intends to provide an electrode coating system configured to enable a continuous coating without interruption.

According to the present disclosure, a failure of the filter is detected in a timely manner so that the filter may be replaced, thereby enabling the production of an electrode having normal and uniform quality.

According to the present disclosure, there is no disruption in production by enabling the continuous coating without interruption of coating during filter maintenance.

According to the present disclosure, the continuous coating without interruption can minimize the loss due to disposal of the slurry and the current collector caused by the additional condition adjustment that occurs when the coating is stopped and then restarted.

Figure 2:
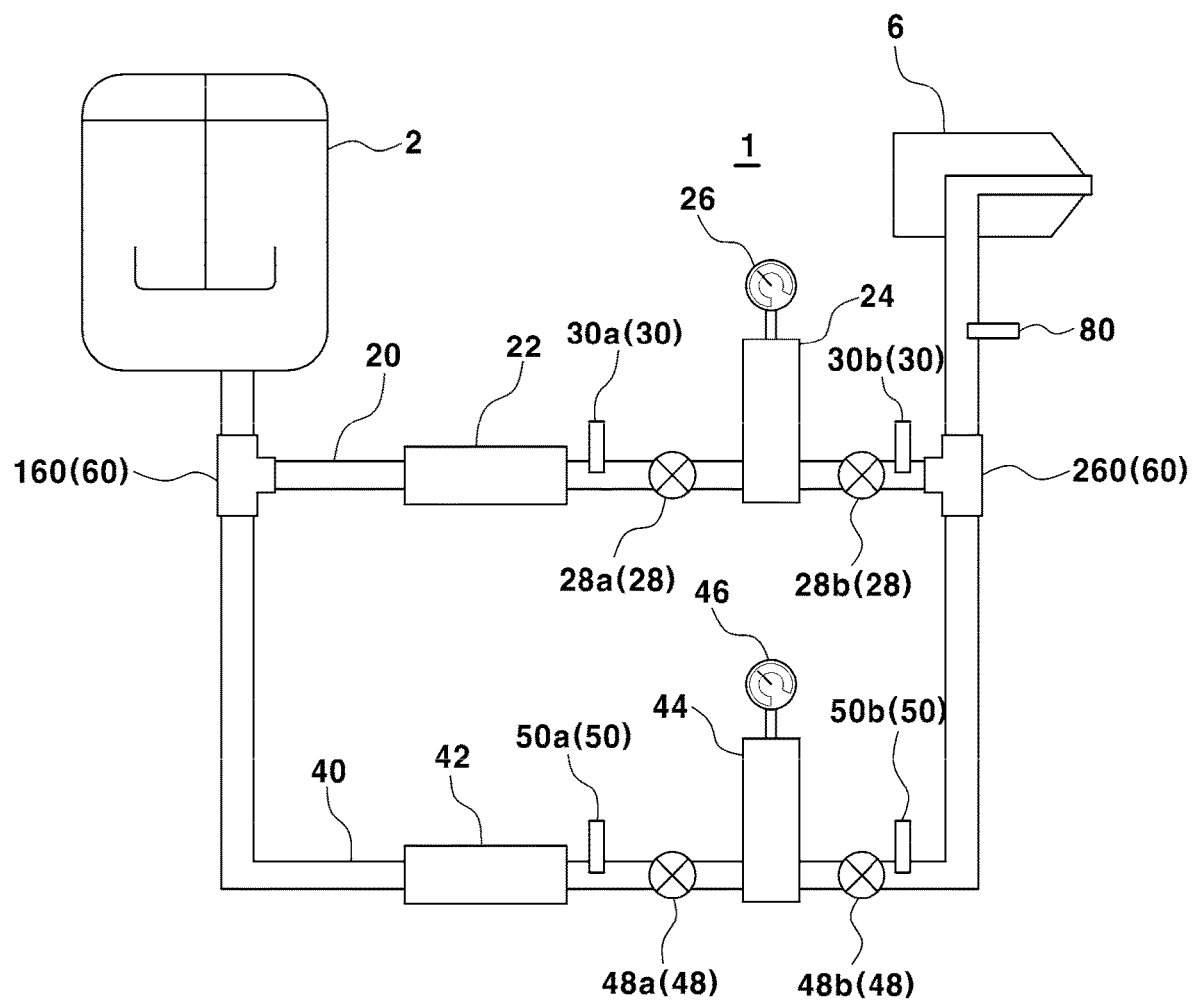
FIG. 2 shows an electrode coating system according to some embodiments of the present disclosure.

FIG. 2 shows an electrode coating system 1 according to an embodiment of the present disclosure. As in the previous case, the slurry storage tank 2 stores the slurry for coating. The coating slot die 6 is a device configured to coat the slurry on the current collector with a uniform thickness and width. The slurry is configured to move from the slurry storage tank 2 toward the coating slot die 6.

According to the present disclosure, the electrode coating system 1 includes a first line 20 and a second line 40. In the electrode coating system 1, the first line 20 and the second line 40, that is, two slurry transport lines are provided in parallel. In other words, both the first line 20 and the second line 40 are configured to supply the slurry of the slurry storage tank 2 to the coating slot die 6, and the first line 20 and the second line 40 are placed in parallel.

Each of the first line 20 and the second line 40 has its own supply pump and filter.

Specifically, the first line 20 is provided with a supply pump 22 of the first line 20 and a filter 24 of the first line 20. The supply pump 22 of the first line 20 provides a moving force to the flow of the slurry through the first line 20, and the filter 24 of the first line 20 is configured to filter the slurry passing through the first line 20. The supply pump 22 is disposed upstream of the filter 24, and the filter 24 is disposed downstream of the supply pump 22 with respect to the flow direction of the slurry in the first line 20.

Similar to the first line 20, the second line 40 is provided with a supply pump 42 of the second line 40 and a filter 44 of the second line 40. The supply pump 42 of the second line 40 provides a moving force to the flow of the slurry through the second line 40. The filter 44 of the second line 40 is configured to filter the slurry passing through the second line 40. The supply pump 42 is disposed upstream of the filter 44, and the filter 44 is disposed downstream of the supply pump 42 with respect to the flow direction of the slurry in the second line 40.

According to some embodiments of the present disclosure, the filter 24 of the first line 20 and the filter 44 of the second line 40 are provided with a pressure gauge 26 of the first line 20 and a pressure gauge 46 of the second line 40, respectively. Each of the pressure gauges 26, 46 is configured to measure the pressure of the filter in which each pressure gauge is installed.

The first line 20 is provided with a gate 28 which may be opened and closed. The gate 28 prevents the slurry remaining in the first line 20 from flowing out when the filter 24 is replaced. For example, the gate 28 may be a one-way valve, but is not limited thereto and any device capable of blocking the flow from the first line 20 may be applied. In one embodiment, the gate 28 includes an upstream gate 28a and a downstream gate 28b. The upstream gate 28a is provided upstream of the filter 24, and the downstream gate 28b is provided downstream of the filter 24 with respect to the flow direction of the slurry in the first line 20.

Similar to the first line 20, the second line 40 is provided with a gate 48 that may be opened and closed. The gate 48 prevents the slurry remaining in the second line 40 from flowing out when the filter 44 of the second line 40 is replaced. For example, the gate may be a one-way valve, but is not limited thereto. In one embodiment, the gate 48 of the second line 40 includes an upstream gate 48a and a downstream gate 48b. The upstream gate 48a is provided upstream of the filter 44 of the second line 40, and the downstream gate 48b is provided downstream of the filter 44 of the second line 40 with respect to the flow direction of the slurry in the second line 40.

According to some embodiments of the present disclosure, the first line 20 includes a flowmeter 30. The flowmeter 30 of the first line 20 is configured to measure an hourly flow rate within the first line 20. In particular, the flowmeter 30 of the first line 20 may measure the flow rates upstream and downstream of the filter 24. In one embodiment, the flowmeter 30 of the first line 20 includes an upstream flowmeter 30a and a downstream flowmeter 30b. The upstream flowmeter 30a is disposed upstream of the filter 24 of the first line 20 with respect to the flow direction of the slurry and configured to measure the flow rate of the slurry within the first line 20 before the slurry is introduced into the filter 24. The downstream flowmeter 30b is disposed downstream of the filter 24 of the first line 20 and configured to measure the flow rate of the slurry within the first line 20 discharged from the filter 24.

According to some embodiments of the present disclosure, the second line 40 includes a flowmeter 50. The flowmeter 50 of the second line 40 is configured to measure an hourly flow rate within the second line 40. In particular, the flowmeter 50 of the second line 40 may measure the flow rates upstream and downstream of the filter 44 of the second line 40. In one embodiment, the flowmeter 50 of the second line 40 includes an upstream flowmeter 50a and a downstream flowmeter 50b. The upstream flowmeter 50a is disposed upstream of the filter 44 of the second line 40 with respect to the flow direction of the slurry and configured to measure the flow rate of the slurry within the second line 40 before the slurry is introduced into the filter 44. The downstream flowmeter 50b is disposed downstream of the filter 44 of the second line 40 and configured to measure the flow rate of the slurry within the second line 40 discharged from the filter 44.

The electrode coating system 1 according to the present disclosure may include a selection unit 60. According to some embodiments of the present disclosure, the first line 20 and the second line 40 may selectively supply the slurry to the coating slot die 6. To this end, in one embodiment, the electrode coating system 1 includes an upstream selection unit 160. The upstream selection unit 160 may allow the slurry discharged from the slurry storage tank 2 to be supplied to the first line 20 or the second line 40. When the upstream selection unit 160 allows the flow of the slurry to the first line 20, the upstream selection unit 160 blocks the flow of the slurry to the second line 40. Conversely, when the upstream selection unit 160 blocks the flow of the slurry to the first line 20, the upstream selection unit 160 may allow the flow of the slurry to the second line 40.

The upstream selection unit 160 is disposed downstream of the slurry storage tank 2 and disposed upstream of the first line 20 and the second line 40. As a non-limiting example, the upstream selection unit 160 may be a three-way valve.

However, as long as a device may operate like the three-way valve, there is no limitation on the upstream selection unit.

In addition, the first line 20 and the second line 40 are joined to extend to the coating slot die 6. A downstream selection unit 260 may be disposed at a junction of the first line 20 and the second line 40. In this specification, the selection unit 60 disposed between the slurry storage tank 2 and the first line 20 and the second line 40 will be referred to as the upstream selection unit 160, and the selection unit disposed at a location where the first line 20 and the second line 40 join to head to the coating slot die 6 will be referred to as the downstream selection unit 260.

The downstream selection unit 260 may direct the flow from any one of the first line 20 or the second line 40 to the coating slot die 6. As a non-limiting example, the downstream selection unit 260 may be a three-way valve, but is not limited thereto. When the downstream selection unit 260 allows the flow of the slurry through the first line 20 toward the coating slot die 6, the downstream selection unit 260 blocks the flow from the second line 40 toward the coating slot die 6. Conversely, when the downstream selection unit 260 blocks the flow of the slurry through the first line 20 toward the coating slot die 6, the downstream selection unit 260 allows the flow from the second line 40 toward the coating slot die 6.

According to some embodiments of the present disclosure, an outlet flowmeter 80 is disposed between the downstream selection unit 260 and the coating slot die 6. The outlet flowmeter 80 is configured to detect the flow rate of the slurry before the slurry is introduced into the coating slot die 6, and, ultimately, a measured value of the outlet flowmeter 80 may be the basis for the adjustment that enables the uniform coating.

As described above, according to the present disclosure, the first line 20 and the second line 40 may also be configured to supply the slurry at different times, but in some embodiments, the first line 20 and the second line 40 may also be configured to transport the slurry simultaneously. When the slurry is simultaneously supplied, the selection unit 60 may be omitted, as will be further described below.

Figure 3:
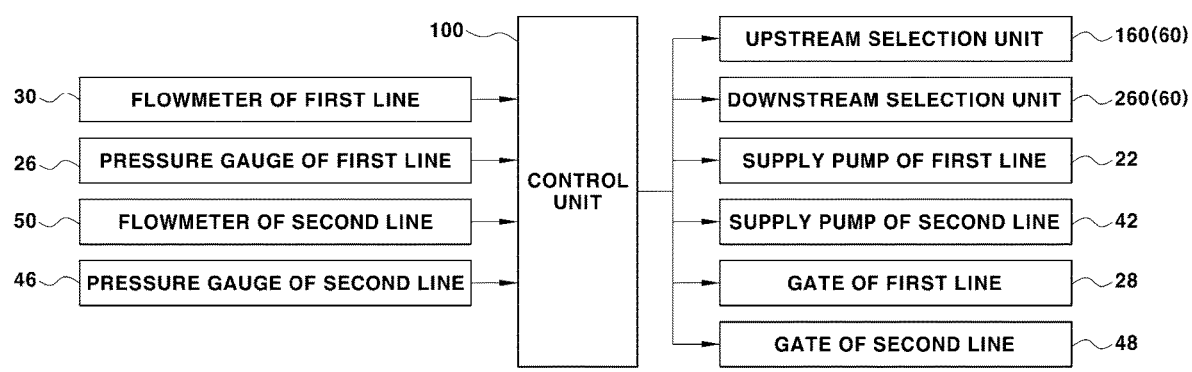
FIG. 3 is system configuration of the electrode coating system according to some embodiments of the present disclosure.

As shown in FIG. 3, a control unit 100 is configured to collect measurement information within the electrode coating system 1. Specifically, the control unit 100 may receive measurement information from the pressure gauge 26 of the first line 20, the pressure gauge 46 of the second line 40, the flowmeter 30 of the first line 20, and the flowmeter 50 of the second line 40. In addition, the control unit 100 is configured to receive the measurement information of the outlet flowmeter 80 from the outlet flowmeter 80. Each of the pressure gauges 26, 46 transmits the pressures of the filters of the first line 20 and the second line 40 to the control unit 100, respectively, and each of the flowmeters 30, 50 transmits the flow rate at each location to the control unit 100 in real time.

In addition, the control unit 100 is configured to control various components within the system. In one embodiment, the control unit 100 allows the flow to the first line 20 or the flow to the second line 40 by controlling the upstream selection unit 160. In one embodiment, the control unit 100 controls the downstream selection unit 260 so that the flow from the first line 20 flows to the coating slot die 6, and controls the downstream selection unit 260 so that the flow from the second line 40 does not flow to the coating slot die 6. Alternatively, the control unit 100 controls the downstream selection unit 260 to block the flow of the slurry from the first line 20 to the coating slot die 6 and allow the flow of the slurry from the second line 40 to the coating slot die 6.

In one embodiment, the control unit 100 controls the operations of the supply pump 22 of the first line 20 and the supply pump 42 of the second line 40. In one embodiment, the control unit 100 may adjust an operation output of the supply pump 22 of the first line 20 or the supply pump 42 of the second line 40 so that the measured value of the outlet flowmeter 80 is constant.

In one embodiment, the gates 28, 48 may be opened or closed by the control unit 100. In another embodiment, the gates 28, 48 may also be manually opened or closed.

Specifically, the control unit 100 may control the operations of the upstream selection unit 160, the downstream selection unit 260, and the supply pumps 22, 42 based on the measured values of the pressure gauges 26, 46 and/or the flowmeters 30, 50. In one embodiment, when the measured value of any one of the pressure gauge 26 of the first line 20 and the pressure gauge 46 of the second line 40 is out of a preset appropriate range, the control unit 100 may control the operations of the upstream selection unit 160, the downstream selection unit 260, the supply pump 22 of the first line 20, and the supply pump 42 of the second line 40. As a non-limiting example, the preset appropriate range of the measured value of the pressure gauge may be 0.1 to 0.5 bar. For example, when the measured pressure of the pressure gauge 26 of the first line 20 is out of the range of 0.1 to 0.5 bar, the filter 24 of the first line 20 may be determined as being failed. In one embodiment, the control unit 100 may control the operations of the upstream selection unit 160, the downstream selection unit 260, and the supply pumps 22, 42 based on the measured value of the flowmeter 30 of the first line 20 or the flowmeter 50 of the second line 40.

Figure 4:
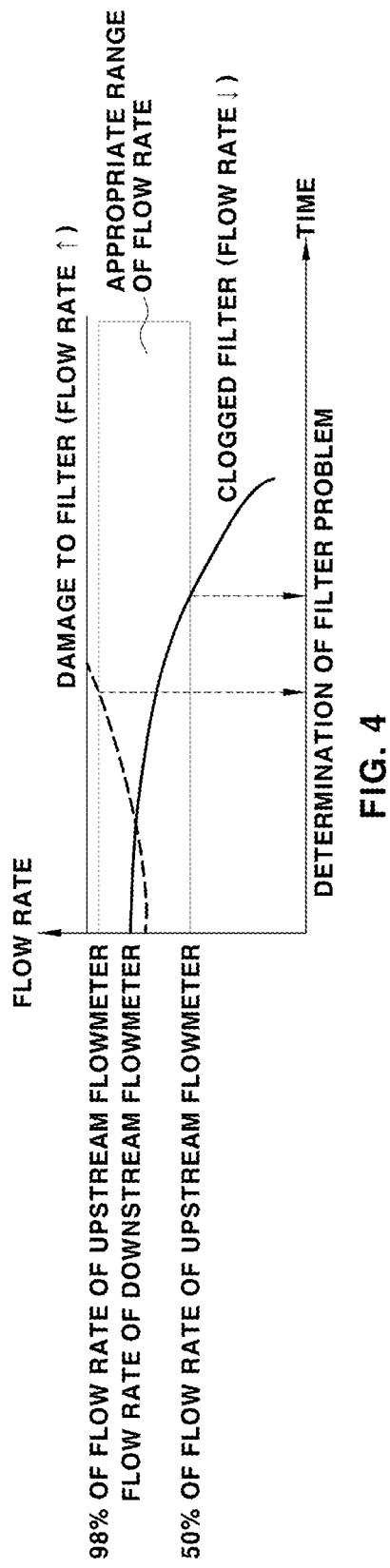
FIG. 4 shows an example in which whether a filter is abnormal is determined according to a change in a flow rate according to the present disclosure.

In one example, as shown in FIG. 4, the flow rate of the slurry measured by the downstream flowmeter 30b of the first line 20 is within 50 to 98% of the flow rate measured by the upstream flowmeter 30a of the first line 20, the control unit 100 may determine that the filter 24 of the first line 20 is operated normally. When the flow rate of the downstream flowmeter 30b of the first line 20 decreases as indicated by the solid line to reach 50% of the flow rate of the upstream flowmeter 30a, it may be determined that the filter 24 is clogged. Conversely, when the flow rate of the downstream flowmeter 30b of the first line 20 increases as indicated by the broken line to reach 98% that is the upper limit of the upstream flowmeter 30a, it may be determined that the filter 24 is damaged, thereby not properly performing the filtering function. This may also be applied to the case of the flowmeter 50 of the second line 40 in the same manner, and the repeating descriptions will be omitted.

Hereinafter, a method of controlling the electrode coating system 1 according to the present disclosure will be described.

Figure 5:
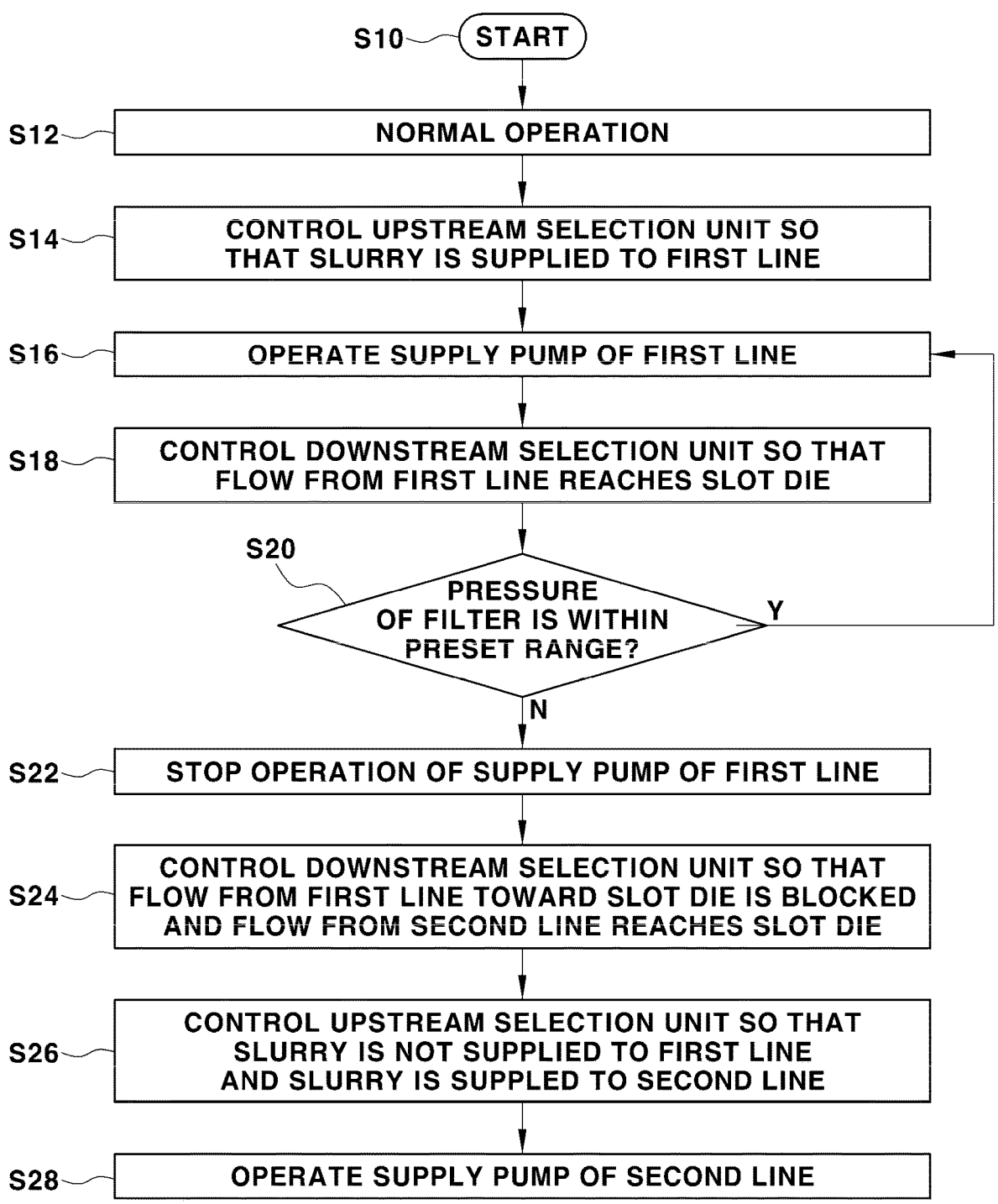
FIG. 5 is a control flowchart of the electrode coating system according to some embodiments of the present disclosure based on a pressure of the filter.

As shown in FIG. 5, according to some embodiments of the present disclosure, the operation of the electrode coating system 1 is started in operation S10.

In operation S12, the electrode coating system 1 is in a normal operating situation (S12). Specifically, the control unit 100 opens a passage to the first line 20 of the upstream selection unit 160 so that the slurry within the slurry storage tank 2 is supplied to the first line 20 at S14. In addition, the supply pump 22 of the first line 20 is driven at S16, and the flow from the first line 20 flows to the coating slot die 6 through the downstream selection unit 260 at S18. During this time, the flow to the second line 40 through the upstream selection unit 160 is blocked, the supply pump 42 of the second line 40 is not operated, and the flow from the second line 40 to the coating slot die 6 is controlled not to flow through the downstream selection unit 260. However, the above operation may also be performed with the second line 40 instead of the first line 20. Since operating the second line 40 instead of the first line 20 based on the above description will be understood by those skilled in the art, the overlapping description thereof will be omitted. Hereinafter, description will be made based on the first line 20.

In operation S20, the control unit 100 continuously collects the measured value of the pressure of the filter 24 from the pressure gauge 26 of the first line 20 and observes whether the pressure of the filter 24 is within the preset appropriate range (S20).

When it is determined that the pressure of the filter 24 is out of the preset appropriate range, that is, when it is determined that the filter 24 has been abnormal, the control unit 100 stops the flow to the first line 20 and allows the flow to the second line 40. Specifically, the operation of the supply pump 22 of the first line 20 is stopped at S22. In addition, the downstream selection unit 260 is controlled to block the flow from the first line 20 toward the coating slot die 6 and allow the flow from the second line 40 toward the coating slot die 6 at S24. In addition, the upstream selection unit 160 is controlled so that the slurry within the slurry storage tank 2 is not supplied to the first line 20 but to the second line 40 through the upstream selection unit 160 at S26. In addition, the supply pump 42 of the second line 40 is operated so that the slurry is continuously supplied through the second line 40 at S28.

By performing the maintenance of the filter 24 of the first line 20 while the second line 40 is driven, it is possible to continuously coat the slurry without interruption. In one embodiment, when the filter 24 of the first line 20 is replaced, the gate 28 of the first line 20 may be closed by the control unit 100. In one embodiment, when the filter 24 of the first line 20 is replaced, the gate 28 of the first line 20 may be manually closed by an operator. When the filter 24 is replaced through the closing of the gate 28, the slurry remaining within the first line 20 is prevented from flowing out.

Figure 6:
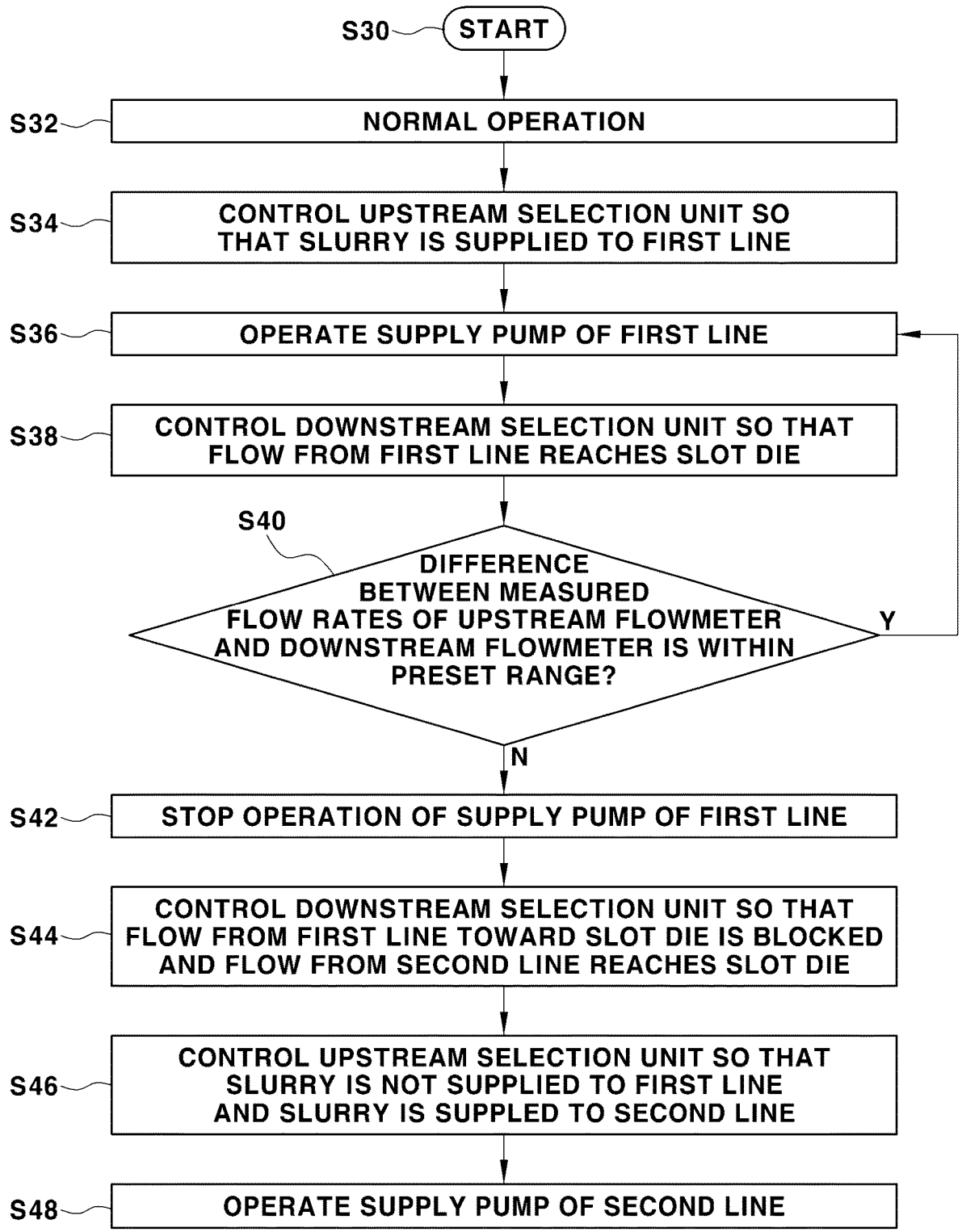
FIG. 6 is a control flowchart of the electrode coating system according to some embodiments of the present disclosure based on a flow rate of a flowmeter.

As shown in FIG. 6, according to some embodiments of the present disclosure, the operation of the electrode coating system 1 is started in operation S30.

In operation S32, the electrode coating system 1 is in a normal operation situation (S32). Specifically, the control unit 100 opens a passage to the first line 20 of the upstream selection unit 160 so that the slurry within the slurry storage tank 2 is supplied to the first line 20 at S34. In addition, the supply pump 22 of the first line 20 is driven at S36, and the flow from the first line 20 flows to the coating slot die 6 through the downstream selection unit 260 at S38. During this time, the flow to the second line 40 through the upstream selection unit 160 is blocked, the supply pump 42 of the second line 40 is not operated, and the flow from the second line 40 to the coating slot die 6 is controlled not to flow through the downstream selection unit 260. However, as described above, the above operation may also be performed with the second line 40 instead of the first line 20. Since operating the second line 40 instead of the first line 20 based on the above description will be understood by those skilled in the art, the overlapping description thereof will be omitted. Hereinafter, description will be also made based on the first line 20.

In operation S40, the control unit 100 collects the measured flow rate of the flowmeter 30 of the first line 20 and determines whether a difference between the measured flow rate of the upstream flowmeter 30*a* of the first line 20 and the measured flow rate of the downstream flow rate 30*b* of the first line 20 is within the preset appropriate range. Alternatively, the control unit 100 determines whether the measured flow rate of the downstream flowmeter 30*b* is within a preset range of the measured flow rate of the upstream flowmeter 30*a*.

When it is determined that the measured flow rate of the downstream flowmeter 30*b* is not within the preset range of the measured flow rate of the upstream flowmeter 30*a*, that is, when it is determined that the filter 24 has been abnormal, the control unit 100 stops the flow to the first line 20 and allows the flow to the second line 40. Specifically, the operation of the supply pump 22 of the first line 20 is stopped at S42. In addition, the downstream selection unit 260 is controlled to block the flow from the first line 20 toward the coating slot die 6 and allow the flow from the second line 40 toward the coating slot die 6 at S44. In addition, the upstream selection unit 160 is controlled so that the slurry within the slurry storage tank 2 is not supplied to the first line 20 but to the second line 40 through the upstream selection unit 160 at S46. Moreover, the supply pump 42 of the second line 40 is operated so that the slurry is continuously supplied through the second line 40 at S48.

Here, when the measured flow rate of the downstream flowmeter 30*b* is smaller than the lower limit value of the preset range, it may be determined that the filter 24 is clogged, and conversely, when the measured flow rate of the downstream flowmeter 30*b* exceeds the upper limit value of the preset range, it may be determined that the filter 24 is damaged, thereby not performing the filtering. According to the present disclosure, by allowing the maintenance of the filter 24 of the first line 20 to be performed while the second line 40 is driven, it is possible to continuously coat the slurry without interruption. In one embodiment, when the filter 24 of the first line 20 is replaced, the gate 28 of the first line 20 may be closed by the control unit 100. In one embodiment, when the filter 24 of the first line 20 is replaced, the gate 28 of the first line 20 may be manually closed by an operator. When the filter 24 is replaced through the closing of the gate 28, the slurry remaining in the first line 20 is prevented from flowing out.

In FIGS. 5 and 6, the case where the pressure of the filter 24 is not normal and the case where the flow rate of the flowmeter 30 is not normal have been described separately, but these may also be determined together.

Figure 7:
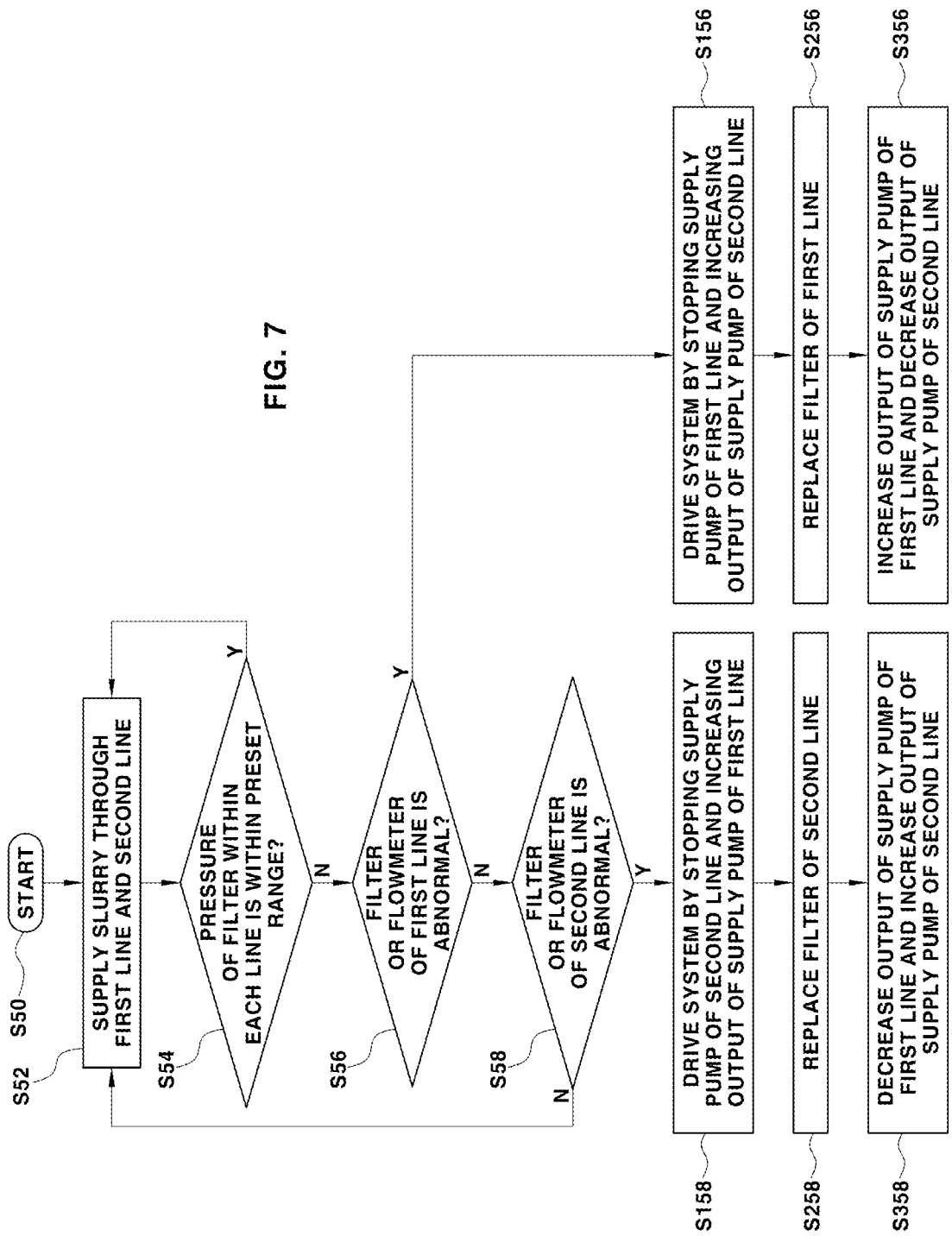
FIG. 7 is a control flowchart of the electrode coating system according to some embodiments of the present disclosure.

Referring to FIG. 7, according to some embodiments of the present disclosure, at the normal operation, the first line 20 and the second line 40 are simultaneously operated. When the filter of any one of the first line 20 and the second line 40 is abnormal, the electrode coating system 1 may be operated by driving only the line including the normally operating filter. In this embodiment, the selection unit 60 may be omitted.

Specifically, a control is started in operation S50. The control unit 100 operates the supply pump 22 of the first line 20 and the supply pump 42 of the second line 40 so that the slurry is supplied to each of the first line 20 and the second line 40 at S52.

At operation, the control unit 100 determines whether the pressure of the filter within each of the lines 20, 40 is within the preset range at S54. When it is determined that the filter is not normally operated based on the pressure of the filter, the control unit 100 determines whether the filter 24 of the first line 20 is abnormal or the filter 44 of the second line 40 is abnormal at S56, S58. Alternatively, the control unit 100 determines whether the flow rate measured value of the first line 20 is abnormal or whether the flow rate measured value of the second line 40 is abnormal.

When it is determined that the filter 24 of the first line 20 is abnormal based on the pressure of the filter or the measured value of the flow rate, the process proceeds to operation S156. The control unit 100 stops the operation of the supply pump 22 of the first line 20 and operates only the supply pump 42 of the second line 40 at S156. The control unit 100 may increase the operation output of the supply pump 42 of the second line 40 to compensate for the operation output of the supply pump 22 of the first line 20 stopped here. Accordingly, according to the present disclosure, the electrode coating system 1 may be operated continuously without any influence despite the failure of the filter 24 of the first line 20. While only the second line 40 is operated, the filter 24 of the first line 20 is replaced at S256. When the replacement of the filter 24 of the first line 20 is completed, the operation of the supply pump 22 of the first line 20 is restored. Here, the control unit 100 increases the output of the supply pump 22 of the first line 20 and decreases the output of the supply pump 42 of the second line 40 which was increased by the controller 100.

When it is determined that the filter 44 of the second line 40 is abnormal based on the pressure of the filter or the measured value of the flow rate at S58, the process proceeds to operation S158. The control unit 100 stops the operation of the supply pump 42 of the second line 40 and operates only the supply pump 22 of the first line 20 at S158. The control unit 100 may increase the operation output of the supply pump 22 of the first line 20 to compensate for the operation output of the supply pump 42 of the second line 40 stopped here. Accordingly, according to the present disclosure, it is possible to continuously operate the electrode coating system 1 without any influence despite the failure of the filter 44 of the second line 40. While only the first line 20 is operated, the filter 44 of the second line 40 is replaced at S256. When the replacement of the filter 44 of the second line 40 is completed, the operation of the supply pump 42 of the second line 40 is restored. Here, the control unit 100 increases the output of the supply pump 42 of the second line 40 and decreases the output of the supply pump 22 of the first line 20 which was increased by the controller 100. In this embodiment, the control unit 100 may control the operation outputs of the supply pump 22 of the first line 20 and the supply pump 42 of the second line 40 based on the measured value of the outlet flowmeter 80. When the flow rate of the outlet flow meter 80 is constantly maintained, the coating may be performed with a uniform and constant quality. Accordingly, the control unit 100 controls the supply pump 22 of the first line 20 and the supply pump 42 of the second line 40 so that the measured flow rate of the outlet flowmeter 80 is constantly maintained while continuously monitoring the measured flow rate of the outlet flowmeter 80.

Figure 8:
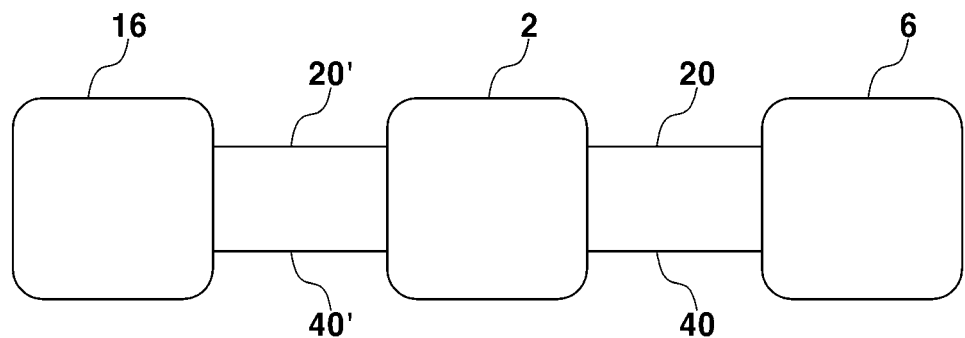
FIG. 8 is schematic view of an expanded electrode coating system according to some embodiments of the present disclosure.

As shown in FIG. 8, the electrode coating system 1 according to the present disclosure may also be applied to the mixing process in addition to the coating process in the electrode manufacturing process. In the mixing process, the slurry within the slurry mixing tank 16 configured to mix the slurry is transmitted to the slurry storage tank 2 through a transport pipe.

Even in the mixing process, when the abnormality of the filter is not detected and the filter is not replaced in a timely manner, impurities may be introduced into the coating process. In addition, the transport of the slurry to the slurry storage tank 2 may be stopped when the filter is replaced, resulting in stopping the coating due to insufficient slurry in the coating process. Accordingly, the present disclosure may include a first line 20' and a second line 40' in the mixing process as well as in the coating process, and the first line 20' and the second line 40' may be controlled to be operated as in the electrode coating system 1. When the slurry is supplied from the mixing system to the slurry storage tank 2, a flow rate control is not important, so that the outlet flowmeter 80 may be omitted.

According to the present disclosure, the abnormality of the filter is detected and the filter is replaced in a timely manner so that the electrodes of normal and uniform quality are produced.

According to the present disclosure, when the filter is disassembled, replaced, or reassembled, the process is automatically switched to a bypass line to continuously perform coating without stopping the coating, so that there is no disruption in the target production volume.

According to the present disclosure, it is possible to minimize the loss due to disposal of the slurry and the current collector caused by the additional condition adjustment that occurs when the coating is stopped and then restarted through the continuous coating.

The above-described present disclosure is not limited by the above-described embodiments and the accompanying drawings, and it will be apparent to those skilled in the art to which the present disclosure pertains that various substitutions, modifications, and changes are possible without departing from the technical spirit of the present disclosure.

The invention claimed is:

1. An electrode coating system comprising:
a slurry storage tank configured to store a slurry;
a coating slot die configured to receive the slurry;
a line through which the slurry flows from the slurry storage tank to the coating slot die, wherein the line includes a first line and a second line, wherein the first line includes a first filter configured to remove impurities from the slurry, and the second line includes a second filter configured to remove impurities from the slurry, and wherein the slurry is configured to selectively flow from the slurry storage tank to the coating slot die through the first line or the second line based on clogging of the first filter or the second filter;
an upstream selection unit configured to direct the slurry to the first line or the second line; and
a control unit configured to control a flow direction of the upstream selection unit based on whether the first filter or the second filter has failed;
wherein the first line includes a set of a first flowmeters, wherein the set of the first flowmeters includes a first upstream flowmeter positioned upstream of the first filter with respect to the flow direction of the slurry through the first line, and a first downstream flowmeter positioned downstream of the first filter with respect to the flow direction of the slurry through the first line; and
wherein the control unit is configured to determine whether the first filter has failed based on comparison between a measured flow rate of the first upstream flowmeter and a measured flow rate of the first downstream flowmeter.

2. The electrode coating system of claim 1,
wherein the first filter includes a first pressure gauge configured to measure a pressure of the slurry through the first filter, and the second filter includes a second pressure gauge configured to measure a pressure of the slurry through the second filter; and wherein the control unit is configured to determine whether the first filter or the second filter has failed based on a measured pressure of the first pressure gauge or the second pressure gauge.

3. The electrode coating system of claim 1, wherein the second line includes a set of a second flowmeters, wherein the set of the second flowmeters includes a second upstream flowmeter positioned upstream of the second filter with respect to the flow direction of the slurry through the second line, and a second downstream flowmeter positioned downstream of the second filter with respect to the flow direction of the slurry through the second line, and wherein the control unit is configured to determine whether the second filter has failed based on a measured flow rate of the set of the second flowmeters.

4. The electrode coating system of claim 1, further comprising a downstream selection unit configured to direct the slurry from the first line or the second line to the coating slot die, wherein the control unit is configured to control a flow direction of the downstream selection unit.

5. The electrode coating system of claim 1, further comprising an outlet flowmeter positioned upstream of the coating slot die with respect to the flow direction of the slurry, the outlet flowmeter being configured to measure a flow rate toward the coating slot die, wherein the control unit is configured to adjust the flow rate of the slurry through the line based on a measured flow rate of the outlet flowmeter.

6. The electrode coating system of claim 5, further comprising a first supply pump configured to provide a flow force to the flow of the slurry through the first line; and a second supply pump configured to provide the flow force to the flow of the slurry through the second line;

wherein the control unit is configured to control the first supply pump or the second supply pump so that the measured flow rate of the outlet flowmeter is constant.

7. The electrode coating system of claim 1, further comprising a first upstream gate positioned upstream of the first filter with respect to the flow direction of the slurry through the first line, and a first downstream gate positioned downstream of the first filter with respect to the flow direction of the slurry through the first line, wherein the first upstream gate and the first downstream gate are openable or closable; and a second upstream gate positioned upstream of the second filter with respect to the flow direction of the slurry through the second line, and a second downstream gate positioned downstream of second filter with respect to the flow direction of the slurry through the second line, wherein the second upstream gate and the second downstream gate are openable or closable.

8. The electrode coating system of claim 1, wherein the coating slot die is configured to coat the supplied slurry on a current collector.

* * * * *